United States Patent [19]
Bober

[11] Patent Number: 5,358,340
[45] Date of Patent: Oct. 25, 1994

[54] BUSHING DEVICE FOR FORMING MULTIPLE PRE-ALIGNED BEARING SURFACE REGIONS IN A ROTARY ASSEMBLY

[75] Inventor: Henry T. Bober, Fairport, N.Y.

[73] Assignee: Xerox Corporation, Stamford, Conn.

[21] Appl. No.: 123,670

[22] Filed: Sep. 20, 1993

[51] Int. Cl.$^5$ .............................................. F16C 17/02
[52] U.S. Cl. .................................... 384/125; 384/291; 384/296
[58] Field of Search ............... 384/125, 296, 299, 300, 384/291, 297

[56] References Cited

U.S. PATENT DOCUMENTS

| | | | |
|---|---|---|---|
| 3,942,403 | 3/1976 | Pramberger | 84/251 |
| 4,196,503 | 4/1980 | McCloskey | 29/149.5 |
| 4,489,992 | 12/1984 | Brandenstein et al. | 384/496 |
| 4,790,672 | 12/1988 | Komplin | 384/296 |
| 5,216,928 | 6/1993 | Kodachi | 384/296 |

Primary Examiner—Lenard A. Footland

[57] ABSTRACT

A single piece, elongate sleeve bearing or bushing device is suitable for use in a bushing hole of a wide free spinning member, such as in the deep bushing hole of a long idler roller, a wide idler pulley, a wide idler gear or the like, to form at least a pair of axially spaced bearing surface regions about a shaft. The single piece bushing device has a thin generally cylindrical wall, an oversized central bore, and a plurality of axially spaced, oversized exterior surface regions including one located at each end of the thin wall. The raised regions are interspaced by a low region, and are compressed locally upon assembly in order to press fit the bushing device into the deep bushing hole of the free spinning member. Such compression causes radially aligned regions of the interior surface of the central bore to close in on the shaft, thereby forming a plurality of axially spaced and pre-aligned bearing surface regions about the shaft.

20 Claims, 3 Drawing Sheets

BUSHING DEVICE FOR FORMING MULTIPLE PRE-ALIGNED BEARING SURFACE REGIONS IN A ROTARY ASSEMBLY

BACKGROUND OF THE INVENTION

The present invention relates to journal bearing devices for use in rotary assemblies, and more particularly to a bearing type bushing device that is suitable for forming multiple pre-aligned bearing surface regions in such a rotary assembly. Journal or rotary assemblies which include a shaft and a free spinning member for relative rotary motion, are well known. Examples of such rotary assemblies include idler gears, idler pulleys, idler rollers, and the like. The use of bearings or bushings, for example, plain journal bearings or bushings to support the idler on the shaft in such an assembly, and to reduce the friction of motion between the shaft and free spinning member, is also well known. Typically, the bearing or bushing device is fitted into a mounting or bushing hole formed in the free spinning member, and the shaft is then received through a central bore or opening in the bearing or bushing device.

The material, size and shape of the bearing or bushing device ordinarily are selected in order to reduce the friction of motion, and in order to maximize the efficiency of motion between the shaft and bearing or bushing device. Furthermore, in order to reduce the risk of vibration (i.e. wobbling) and of misalignment between the shaft and bearing or bushing, such bearing or bushing device should be made as long as the portion of the shaft journaled in or through the mounting hole of the free spinning member. Unfortunately however, there are problems and limitations regarding the effective length of such a journal bearing or bushing device.

This is in part because the longer the bearing or bushing, the greater the bearing surface area, and therefore possibly the greater the friction force to overcome. In addition, the load bearing capacity of a bearing or bushing in such a rotary assembly has been shown to depend in significant part on the length-to-diameter ratio of the bearing or bushing device. Ordinarily, this ratio is recommended to be within the range of 1 to 2, the result of which is usually a relatively short journal bearing or bushing device. Longer bearings or bushing devices with a length-to-diameter ratio of 3 to 4 are recommended, but only for light load assemblies, and only if the journal bearing or bushing device is self-aligning to the shaft.

These problems and limitations are particularly of concern with respect to the design of journal bearings or bushings for rotary assemblies which include wide free spinning members or idlers such as long idler rollers, wide idler pulleys, wide idler gears or the like which each have a deep hub and bushing hole therethrough. Such rotary assemblies therefore require a relatively longer bearing or bushing device. As those skilled in the art recognize, there has been a need for a simple, suitable and low cost journal bearing or bushing for use with such rotary assemblies.

As disclosed for example in Xerox Disclosure Journal, p.33 Vol. 13 No. 1, the conventional practice when a long bearing or bushing is needed for such a deep bushing hole, has been to use a pair of such bearings or bushings, fitting one from each end of the bushing or mounting hole of the free spinning member. The use of multiple bearings or bushings as such is relatively more expensive than the use of a single piece, long bearing or bushing. On the other hand, conventional self-aligning bearings or bushings are ordinarily short, or include multiple separate parts. Consequently, they are not individually suitable for wide free spinning members having a deep mounting or bushing hole, or they are relatively more expensive to manufacture and to assemble than is a single piece bearing or bushing.

For example, U.S. Pat. No. 3,942,403 issued Mar. 9, 1976, to Pramberger discloses a short and therefore unsuitable single unit bushing device for inserting into a bushing hole of mating piano action members. The disclosed bushing device is made of a suitable plastic or elastomeric material and includes one flanged end and a single raised midpoint that is compressed upon assembly of the bushing around a journaled pin. The compression causes an inner bore of the bushing to form a single, substantially line contact bearing surface with the journaled pin.

U.S. Pat. No. 4,196,503 issued Apr. 8, 1980, to McCloskey discloses a complicated and therefore relatively expensive spherical bearing assembly that is made up of multiple separate and compressible inner and outer parts. During assembly, the outer parts are compressed causing the inner part to form a single uniform self-aligning bearing surface against a journaled shaft.

U.S. Pat. No. 4,489,992 issued Dec. 25, 1984, to Brandenstein et al. discloses a short self-aligning bearing assembly of multiple, separate parts that includes an outer a sleeve which is covered with an elastic plastic jacket. The jacket has a single raised annular ridge on it that is press fitted upon assembly into a bushing hole, thereby compressing the plastic jacket and forcing the bushing sleeve into alignment against a journaled shaft.

SUMMARY OF THE INVENTION

In accordance with the present invention, a bushing device is provided for assembly about a journaled shaft in the mounting or bushing hole of a rotary assembly. The bushing device consists of a generally cylindrical wall that is made of a compressible material, and has an interior surface and an exterior surface. The interior surface defines a central bore which before assembly has a uniform diameter that is greater than the diameter of the journaled shaft. The exterior surface includes a low region and a plurality of raised regions. The low region has a diameter that is less than the diameter of the bushing hole, and the raised regions each has a diameter that is greater than the diameter of the bushing hole, such that upon a press fit assembly of the bushing device into the bushing hole, a plurality of regions of the interior surface, which are aligned radially with the plurality (normally two) of raised regions of the exterior surface, are compressed inwardly to form a plurality of interior bearing surface regions about the shaft.

BRIEF DESCRIPTION OF THE DRAWINGS

Other features of the present invention will become apparent as the following detailed description proceeds, and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

Figure 1:
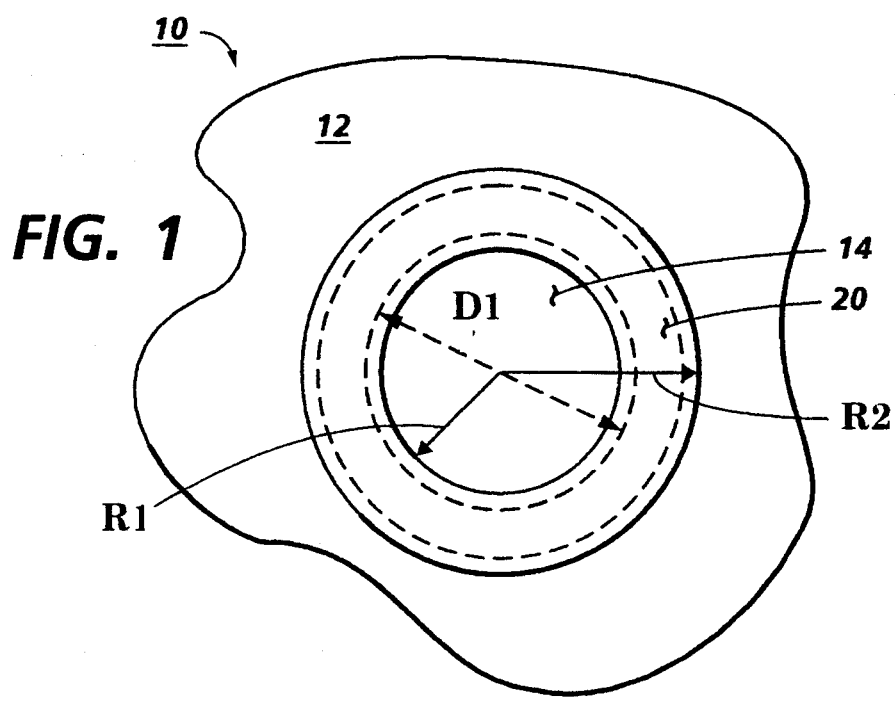
FIG. 1 is a schematic elevational view of a rotary assembly incorporating the journal bushing device of the present invention.

Referring now to FIG. 1, a partial end view of only the hub portion of a rotary assembly of the present invention is shown generally as 10, and includes a free spinning member 12, a mounted shaft 14 having a radius R1 (hence a diameter equal to 2R1), and the bushing device of the present invention shown generally as 20 (to be described below). The free spinning member 12, for example, can be an idler gear, an idler pulley, an idler roller or the like as are commonly used in such assemblies. As shown, the bushing device 20 is inserted into a mounting or bushing hole that is formed in the hub of the free spinning member 12, and that has a radius R2 (hence a diameter equal to 2R2). In its assembled state as shown in FIG. 1, the bushing device 20 has a maximum outer diameter that is substantially the same as the diameter 2R2 of the mounting hole of the free spinning member. As further shown, a portion of the shaft 14 is journaled in or through a central bore 40 (see FIG. 2) of the bushing device 20.

Figure 2:
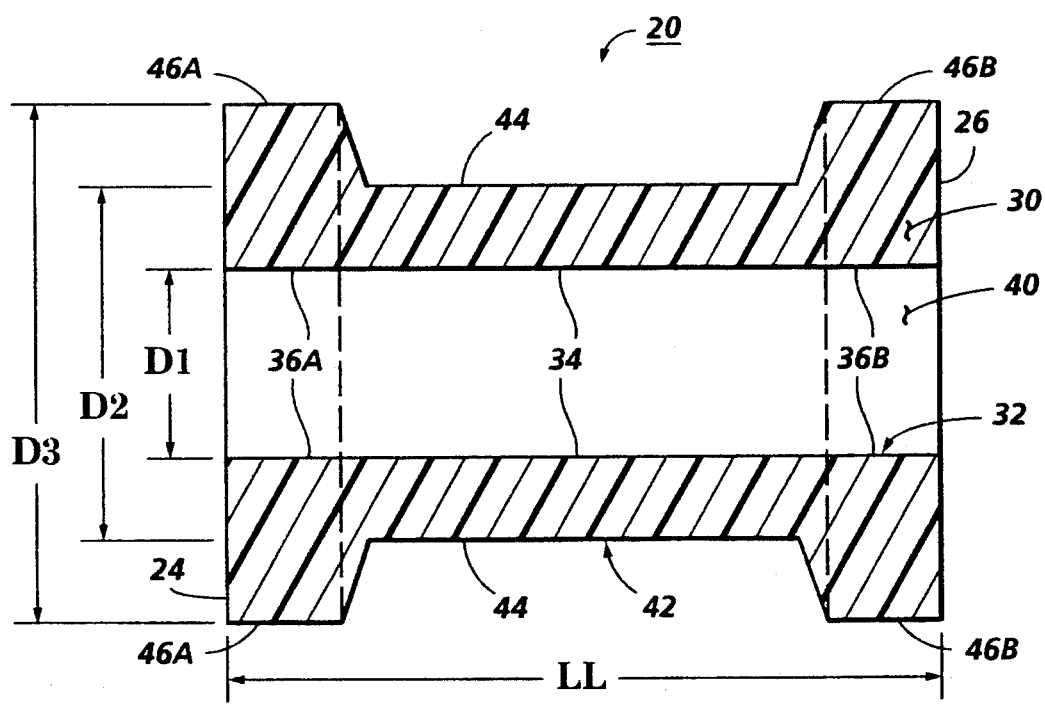
FIG. 2 is is a sectional elevational view of the bushing device of FIG. 1 in an unassembled state.

Referring now to FIG. 2, a longitudinal cross-section of the bushing device 20 in its unassembled state is illustrated. The bushing device 20 has an overall length LL that is suitable for effectively supporting the journaled portion of a shaft 14 within the deep mounting or bushing hole of a wide free spinning member. As illustrated, the bushing device 20 has first and second headless ends 24 and 26 respectively, and consists of a generally cylindrical wall 30. Preferably, the wall 30 is made of a compressible material suitable for a sleeve bearing, for example, a plastic. The particular plastic material should have a low coefficient of friction. Some examples of such plastic materials include NYLON (a long-chain synthetic polyamide with a protein-like chemical structure), and DELRIN (a linear polyoxymethylene-type acetal resin material), which are both tradenames of the DuPont Co.

As further illustrated, the wall 30 has an interior surface 32 that includes a first region 34, and a plurality of second regions shown as 36A, 36B. Together, the first region 34 and plurality of second regions 36A, 36B define a central bore 40 of the bushing device 20 for receiving the journaled portion of a shaft 14 of a rotary assembly 10. The central bore 40 has a uniform diameter D1, that before assembly or uncompressed, is greater than the finished external diameter of the assembled bushing, and greater than the diameter 2R1 of the journaled portion of the shaft 14. The wall 30 also has a non-uniform exterior surface 42 that includes a low region 44, and a plurality of raised regions 46A, 46B that are located towards and adjoining the first and second ends 24, 26 respectively. As shown, the low region 44 is radially aligned with the first region 34 of the interior surface 32, and has a diameter D2 that is less than the diameter 2R2 of a mounting or bushing hole of a free spinning member 12. The plurality of raised regions 46A, 46B are each radially aligned with the plurality of second regions 36A, 36B respectively of the interior surface 32. Each raised region 46A, 46B has a diameter D3 that is selected such that it is greater than the diameter 2R2 of the mounting or bushing hole of a free spinning member 10. The raised regions 46A, 46B are spaced axially one from the other along the wall 30, and are interspaced by a low region 44. Advantageously, the axial dimension, and hence total area surface of each raised region is less than that of the low region 44. Preferably, the diameter of each raised region is uniform and hence each region is circumferentially continuous around the cylindrical wall 30.

Although the generally cylindrical wall 30 of the bushing device 20 has been illustrated to include only a pair of second regions 36A, 36B of the interior surface 32, as well as, correspondingly only a pair of radially aligned raised regions 46A, 46B of the exterior surface respectively, it is understood that a plurality of more than two of such aligned and axially spaced regions could be included in the formation of the wall 30. However, in order to prevent undesirable vibration or excessive cocking of an idler or the like spinning on a shaft, one raised region should be located towards and adjoin each end of the wall 30.

Figure 3:
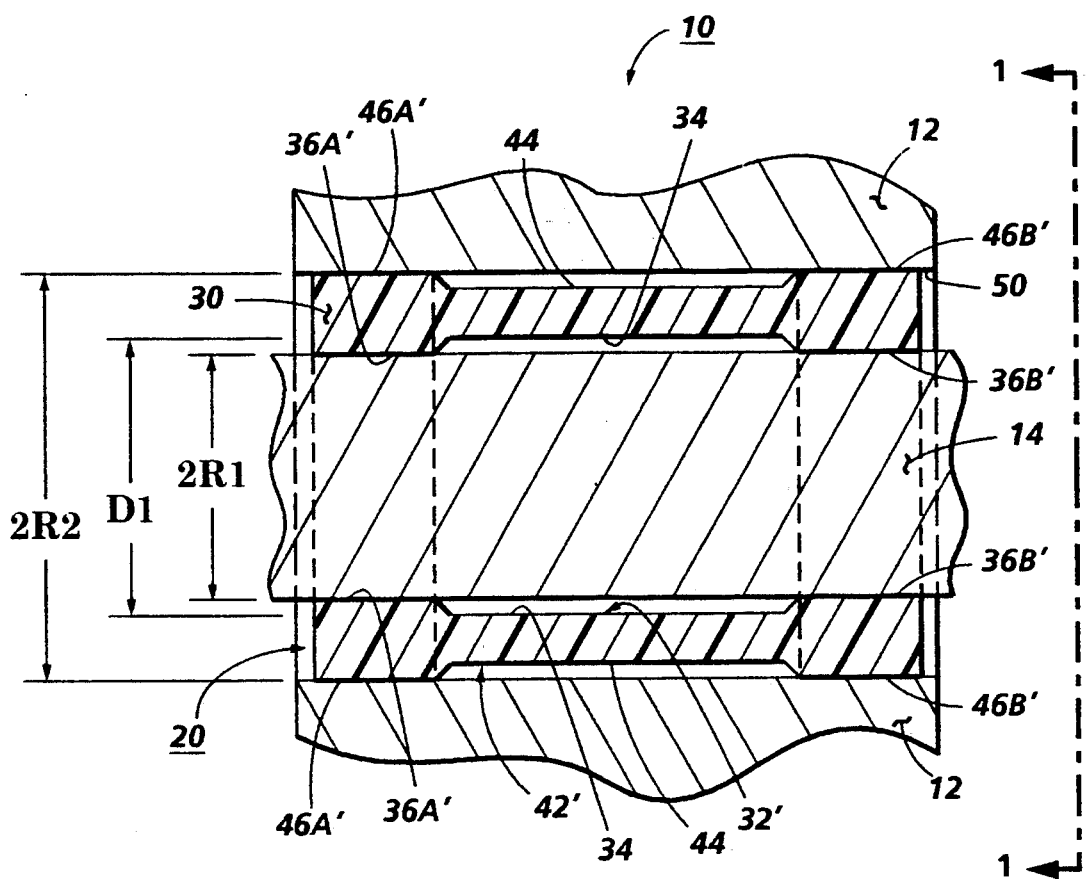
FIG. 3 is a sectional elevational view of the bushing device of FIG. 1 in a press fit assembled state.

Referring now to FIG. 3, a partial longitudinal cross-section of the hub portion of a rotary assembly 10 is shown including the bushing device 20 in its assembled or compressed state. The central bore 40 of the bushing device 20 is placed around the mounted or journaled portion of the shaft 14, and the device 20 is then press fitted into the bushing hole 50 of a free spinning member 12. Because only the diameter D3 of the raised regions 46A, 46B of the exterior surface 42 of the bushing device 20 is greater than the diameter 2R2 of the bushing or mounting hole 50, only the raised regions 46A, 46B are compressed during the press fitting into the hole 50. In their compressed state, these raised regions are shown as 46A', 46B'. The inwardly compressed regions 46A', 46B', inturn inwardly and radially compress the wall 30 locally, thereby causing the radially aligned second regions 36A, 36B of the interior surface to close in on the journaled portion of the shaft 14 forming a plurality of bearing surface regions shown as 36A', 36B'. With the plurality of compressed second regions 36A', 36B' closing in on the shaft 14, the interior surface now shown as 32' in the assembled state, is no longer uniform.

As shown, the interior surface 32 now includes the bearing surface regions 36A', 36B' which each contact the shaft 14 with a slight clearance(normal for plastic sleeve bearings), and therefore define an interior diameter slightly greater than the diameter of the shaft 14. Formed thus, the bearing surface regions 36A', 36B' are aligned with each other, a condition that is normally difficult to achieve with two separate bushings as used conventionally.

Still referring to the drawings, it should be noted that the first portion 34 of the interior surface 32' however is uncompressed and therefore retains substantially its unassembled diameter D1 which is greater than the diameter 2R1 of the shaft 14. As such the first region 34 is effectively out of contact with the shaft 14, thereby reducing the actual amount of interior surface area of the bushing device 20 that is in frictional contact with the shaft 14. Although the assembled exterior surface 42' is still shown as being non-uniform, it can be uniform if the diameter of the low region 44 is made such that it is substantially equal to the diameter of the bushing or mounting hole 50, and hence it will be equal to the compressed diameter of each raised region 46A', 46B'.

As such, upon assembly, the low region surface area 44 will fit uncompressed within the bushing hole 50, thereby giving the appearance of a uniform assembled exterior surface to the bushing device 20. In addition, by providing clearance through the central section of the assembled bushing, drag is minimized on the free spinning member 12 because the entire assembly is less sensitive to shaft straightness and deflection factors.

As can be seen, a single piece, elongate sleeve bearing or bushing device has been provided for use in a deep bushing hole of a wide shaft-carrying member, such as in the deep bushing hole of a long roller, a wide pulley, a wide gear or the like. The sleeve bearing or bushing device is used as such for forming at least a pair of axially spaced bearing surface regions about a supported shaft. The single piece bushing device is preferably fabricated from a compressible plastic material, for example by injection molding, and it has a thin generally cylindrical wall, an oversized central bore, and a plurality of axially spaced, oversized exterior surface regions including one located at each end of the thin wall. The raised regions are interspaced by a low region thereby giving the exterior surface a stepped, non-uniform shape. Upon assembly, the raised regions, which each have a diameter greater than that of the bushing hole, are compressed in order to press fit the bushing device into the deep bushing hole of the free spinning member. Such compression causes radially aligned regions of the interior surface of the central bore to close in on a mounted shaft, thereby forming a plurality of axially spaced bearing surface regions about such shaft.

Because the elongate bushing device is made as a single piece, the plurality of bearing surface regions that are so formed as are pre-aligned. In addition, the number of bushing or bearing parts as well as the number of required assembly operations are advantageously and relatively reduced. As a result, the present invention is a relatively less expensive journal bushing device that is long enough to effectively and efficiently support a wide hubbed rotating member about a shaft.

What is claimed is:

1. A bushing device for use in a mounting hole of a rotary assembly around a journaled shaft, the bushing device comprising a generally cylindrical wall made of a compressible material and including:
   (a) an interior surface defining a central bore for receiving the journaled shaft, said central bore having a uniform unassembled diameter greater than the diameter of the journaled shaft; and
   (b) an exterior surface including a low region having a diameter less than the diameter of the mounting hole of the rotary assembly, and a plurality of raised regions each having a diameter greater than the diameter of such mounting hole, whereby upon assembly, a plurality of regions of said interior surface, aligned radially with said plurality of raised regions of said exterior surface, are compressed inwardly to form a plurality of bearing surface regions around the journaled portion of the shaft.

2. A bushing device comprising a generally cylindrical wall for inserting into a bushing hole of a rotary assembly, said cylindrical wall being made of a compressible material and including:
   (a) an interior surface including a first region, and a plurality of second regions, said first region and said plurality of second regions defining a central bore for receiving a journaled portion of a mounted shaft of the rotary assembly, said central bore having a uniform uncompressed diameter greater than the diameter of the journaled portion of the mounting shaft; and
   (b) a non-uniform exterior surface including:
      (i) a low region radially aligned with said first region of said interior surface, said low region having a diameter less than the diameter of the bushing hole of the rotary assembly; and
      (ii) a plurality of raised regions each being radially aligned with one of said plurality of second regions of said interior surface, each of said plurality of raised regions having a diameter greater than the diameter of the bushing hole, whereby inserting the bushing device into the bushing hole creates a press fit therein of each of said plurality of raised regions, thereby compressing each said raised region radially inward, and moving each said radially aligned second region of said interior surface inwardly, thus forming a compressed central bore having a diameter substantially equal to the diameter of the journaled portion of the mounting shaft.

3. The bushing device of claim 2, wherein said generally cylindrical wall includes first and second ends at least one of which is headless so as to enable insertion into the bushing hole of a rotary assembly.

4. The bushing device of claim 3, wherein both said first and second ends of said wall are headless.

5. The bushing device of claim 2, wherein said compressible material includes a plastic material.

6. The bushing device of claim 5, wherein said plastic material includes a synthetic polyamide.

7. The bushing device of claim 5, wherein said plastic material is a linear polyoxmethylene-type acetal resin material.

8. The bushing device of claim 2, wherein said plurality of raised regions are each spaced axially one from the other on said cylindrical wall.

9. The bushing device of claim 8, wherein said raised regions are interspaced with a low region of said exterior surface.

10. The bushing device of claim 9, wherein said low region has an axial dimension that is greater than that of each of said raised regions.

11. The bushing device of claim 8 wherein each of said raised regions has a uniform diameter and is continuous circumferentially around said cylindrical wall.

12. The bushing device of claim 2, wherein said plurality of raised regions includes first and second raised regions located near said first and second ends respectively of said cylindrical wall.

13. The bushing device of claim 12, wherein said first and second raised regions adjoin said first ends respectively of said cylindrical wall.

14. The bushing device of claim 2, wherein said low region of said non-uniform exterior surface has a diameter less than the diameter of the bushing hole of a free spinning member of the rotary assembly.

15. A rotary assembly comprising:
   (a) a free spinning member including a hub portion defining a mounting hole having a selected diameter;
   (b) a shaft including a portion thereof mounted within said mounting hole, said mounted portion of said shaft having a diameter less than said selected diameter of said mounting hole; and (c) a single piece bushing device press fitted into said mounting hole and around said mounted portion of said shaft, said bushing device comprising a generally cylindrical wall including:
  (i) an interior surface defining a central bore containing said mounted portion of said shaft, said interior surface including a first region thereof out of contact with said mounted portion of said shaft and a plurality of axially spaced second regions contacting and forming a plurality of bearing surface regions for said mounted portion of said shaft; and
  (ii) an exterior surface including a non-compressed region radially aligned with said first region of said interior surface, and a plurality of axially spaced compressed regions each being radially aligned with one of said second regions of said interior surface, each of said plurality of compressed regions forming a press fit within said mounting hole, thereby compressing said wall radially inward and causing said radially aligned second regions of said interior surface to close in on said mounted portion of said shaft and to form said plurality of bearing surface regions.

16. The rotary assembly of claim 15, wherein said non-compressed region is spaced from the interior surface of said mounting hole of said free spinning member.

17. The rotary assembly of claim 16, wherein said free spinning member is a roller.

18. The rotary assembly of claim 16, wherein said free spinning member is a pulley.

19. The rotary assembly of claim 16, wherein said free spinning member is a gear.

20. The rotary assembly of claim 15, wherein said mounted portion of said shaft is journaled for rotation relative to said bushing device and said free spinning member.

* * * * *